United States Patent [19]

Anayama

[11] Patent Number: 4,753,756

[45] Date of Patent: Jun. 28, 1988

[54] RADIATION SHIELDING MATERIAL

[75] Inventor: Yoshimasa Anayama, Kawasaki, Japan

[73] Assignee: Sanoya Industries Co., Ltd., Kanuma, Japan

[21] Appl. No.: 905,274

[22] Filed: Sep. 9, 1986

Related U.S. Application Data

[63] Continuation-in-part of Ser. No. 686,830, Dec. 27, 1984, abandoned.

[30] Foreign Application Priority Data

Jul. 10, 1984 [JP] Japan ............................ 59-141494

[51] Int. Cl.[4] ............................ C04B 35/68

[52] U.S. Cl. ............................ 252/478; 423/561 R; 423/620

[58] Field of Search ............ 252/478; 423/620, 561 R

[56] References Cited

U.S. PATENT DOCUMENTS 1,278,010 9/1918 Poetschke ............................ 252/478

1,602,688 10/1926 Lindsay ............................ 252/478

FOREIGN PATENT DOCUMENTS

| | | | |
|---|---|---|---|
| 1171798 | 9/1957 | Fed. Rep. of Germany | 252/478 |
| 1175282 | 3/1959 | France | 252/478 |
| 1362908 | 7/1962 | France | 252/478 |
| 1560085 | 3/1969 | France | 252/478 |
| 25959 | 8/1970 | Japan | 252/478 |
| 25898 | 3/1978 | Japan | 252/478 |
| 45911 | 6/1962 | Poland | 252/478 |

*Primary Examiner*—Teddy S. Gron
*Assistant Examiner*—Catherine S. Kilby
*Attorney, Agent, or Firm*—Bucknam and Archer

[57] ABSTRACT

A radiation shielding material prepared by thermally melting a mixture of sulphur and iron oxide powder to react the mixture thoroughly so as to obtain a melt, adding lead oxide granules to the thus obtained melt to mix them together thereby dispersing the former in the latter and then forming the whole mass into a predetermined shape.

5 Claims, 3 Drawing Sheets

RADIATION SHIELDING MATERIAL

This application is a continuation-in-part of abandoned Ser. No. 06/686,830 filed 12/27/84.

BACKGROUND OF THE INVENTION (1) Field of the Invention

This invention pertains to a shielding material suitable for shielding radioactive rays other than neutron rays.

(2) Prior Art

There have heretofore been generally used concrete or shielding lead blocks as the radiation shielding materials. Such materials have been used as the construction materials in constructing, for example, buildings wherein radioisotopes, X rays, nuclear reactors or like matters are used.

3. Points to be Solved by this Invention:

Concrete structures as mentioned above are required to have not only the necessary structural strength but also a wall thickness which should be determined depending on the amount of radioactive radiation of a radioisotope or the like used in the structures in order to shield the radiation, resulting in very heavy structures compared to ordinary buildings. Since concrete structures are liable to absorb water, they tend to absorb radioactively contaminated water when used in installations wherein radioactive rays are handled, whereas the contaminated water thus absorbed is extremely difficult to remove by washing. In consequence, the concrete structures are normally coated with waterproof paint or overcoated with polymer concrete to reduce or prevent their water absorption, this disadvantageously incurring a great expense. Lead is a very effective shielding material but is very heavy and in addition because of its soft quality, requires much care in construction, thus raising the construction cost.

On the other hand, known radiation shielding materials are prepared from heavy metals or raw ores of them. Generally speaking, the higher the product density is, the greater the primary shielding effect becomes. Accordingly, attempts are being made to obtain shielding products either by molding and solidifying various heavy metal oxides and their ores with cement, an organic curable binder or the like or by compression molding heavy metal compounds and then calcining the molded metal compounds at high temperatures. However, the density of end products is still low although the heavy metal compounds and the like used as the starting materials have their respective inherent high densities, because the starting materials are mixed with various binders depending on uses of the resulting products when they are molded. For this reason, the products or shielding materials thus obtained indicate a low radiation shielding effect and have, as structural material, a strength not greater than that of concrete. Therefore, such shielding materials alone are unsuitable for radioactive shielding purposes. Particularly, the shielding materials in which the organic binder is used has an extremely low strength which is 1/50–1/100 of the strength of concrete. Accordingly, the shielding materials of this sort have simply been used as an auxiliary radiation shielding material by attaching or applying to the surface of concrete structures. Further, many of the binders tend to cause a radical chemical reaction under the irradiation of $\gamma$ or X rays whereby, with the lapse of time, they are degraded in bonding property and a concrete structure having them used therein is consequently reduced in strength.

As set forth above, although extensive research and development have been made to obtain various kinds of radiation shielding materials, they have advantages and disadvantages and are still unsatisfactory in shielding effects, mechanical strength, water resistance and chemical resistance.

SUMMARY OF THE INVENTION

The main object of this invention is to provide a new type of low cost shielding material that eliminates the above mentioned disadvantages and has sufficient structural strength, superior formability, workability and applicability.

Means of Solving the Problems

The present inventor discovered that a material made of an inorganic melt matrix and heavy metal compound possesses a high shielding effect, after which he made various studies and tests to complete this invention. Iron oxide is the most physically stable when used in the form of a melt matrix, is easily available industrially at a low price, and is very useful as a vehicle for dissolving an inorganic material therein since sulphur has a high fusion covalent bond, reaches an equilibrium with its own monoclinic sulfur at the reaction temperature used in this invention thereby containing molecules having a crown shaped $S_8$ ring and will cause a rubbery sulfur-producing reaction when cast in a cold mold after being treated by the fusion reaction with the iron oxide at 400°±10° C., resulting in providing some elasticity to the original sulphur. It is also very easily available. As the heavy metal compound from which to expect the shielding effect, there was chosen lead oxide the metal of which has the highest specific gravity of the commercial metals.

The ratio by weight between the sulphur, iron oxide and lead oxide is in the range of 100:60–110:120–360.

The radiation shielding material of this invention is characterized in that it is prepared by heating 100 parts by weight of sulphur and 60–110 parts by weight of iron oxide powder to thoroughly react them together whereby a molten matrix is obtained, adding 120–360 parts by weight of granular lead oxide to said molten matrix to disperse said lead oxide in the matrix, molding the resulting dispersion into a predetermined shape to obtain a molding and cooling the molding for solidification thereof.

In order to prevent pollution caused by $SO_2$ generated as a minor by-product by the dissolution of sulphur, it is preferable that some amount of lead powder be preliminarily added to the sulphur since the generated $SO_2$ is entirely absorbed into the solid solution system as shown in the following equation:

$$2Fe_2O_3 + S \rightarrow 4FeO + SO_2$$

$$3Pb + SO_2 \rightarrow 2PbO + PbS$$

The unreacted lead powder remains as it was in the solid solution and helps the radiation shielding effect. The PbS so produced is also effective in shielding radioactive radiation.

In the above case, 5–13% by weight of the lead oxide may be substituted by lead.

The radiation shielding material of this invention is obtained by melting sulphur at 115° C.–440° C., adding iron oxide powder to the molten sulphur to thoroughly mix and react them together to obtain a molten matrix, further adding a desired amount of granular lead oxide to the thus obtained molten matrix to mix and agitate together at 125°-420° C. for 10-35 minutes thereby to fully disperse the former in the latter, molding the resulting dispersion while its viscosity remains in the range of from 100,000 to 1,000,000 centipoises and then cooling the resulting molding to solidify in desired forms such as plates, blocks or cylinders, according to the purposes they will be used for.

The sulphur used in this invention can be of lump, powder or flake forms and by-products of oil refineries can be used. The iron oxide used herein is of industrial grade, and the particle size of the granules thereof is small in order to attain a sufficient reaction with the molten sulphur and is preferably ranging from 60 to 325 mesh (JIS), more preferably from 60 to 200 mesh.

The desirable time for thermal reaction of iron oxide and molten sulphur is in the range of about 10-60 minutes, preferably about 25-35 minutes, although it depends on the grain size of the iron oxide.

The lead oxide to be added to the melt matrix obtained in the above mentioned way is of industrial grade and the grain size thereof is preferably in the range of from 300 mesh to 5 mm in dia. With a size below 300 mesh, the viscosity of a mixture of the lead oxide with the melt matrix becomes too high, making the casting of the mixture difficult. When the grain size is mainly 5 mm in dia., radiation may be transmitted through the cast product.

Function

The radiation shielding effect may generally be governed by the law of mass, that is, $I = BI_oe^{-\mu x}$ wherein I is a 65 -ray dose rate after the transmittance through a shielding material, $I_o$ is a $\gamma$-ray dose rate before the transmittance therethrough, B is a build-up coefficient, $\mu$ is an attenuation coefficient and x is the thickness of the shielding material, and is considered proportional to the specific gravity of the shielding materials at the same thickness. In this invention, however, as shown in the examples and comparison examples described later, the cooled sulphur.iron oxide melt itself shows a greater shielding effect than can be expected from its specific gravity. Furthermore, although the mechanism is not known, a mixture prepared by adding lead oxide to the sulphur.iron oxide melt shows a markedly greater shielding effect as the synergistic effect than can be expected from its specific gravity.

The reason why this shielding effect occurs is not known theoretically but it is believed that when radiation is applied to the shielding material of this invention, it gives kinetic energy to the atom and molecule of the shielding material and the proton beam loses its energy causing nuclear non-elastic scattering. Furthermore, it is believed that the collision of the radiation with the shielding material produces ionization phenomenon thereby to lose energy which is equal to that used for the ionization. This phenomenon is also believed to occur with $\alpha$-rays and other light ions.

The shielding material of this invention is sufficiently isotropic and it is therefore considered that microscopically the ion takes a zigzag course by Rutherford scattering but macroscopically it advances along an almost straight line and also considered that the ion ray which advances straight loses its energy rapidly. The shielding performance of the invented shielding material dE/dZ, that is, the friction force F, at this time is believed to be great. Furthermore, with $\gamma$-rays, the original energy E changes at times to a different energy E' by Compton scattering, which is believed to be caused by the fact that when the $\gamma$-ray beam hits the invented shielding material, the intensity of the beam is reduced and $\gamma$-ray is lost by photoelectric effect.

The invention will then be better understood by the following examples and comparison examples by reference to the accompanying drawing.

EXAMPLE 1-4 AND COMPARATIVE EXAMPLES 1-4

Figure 1:
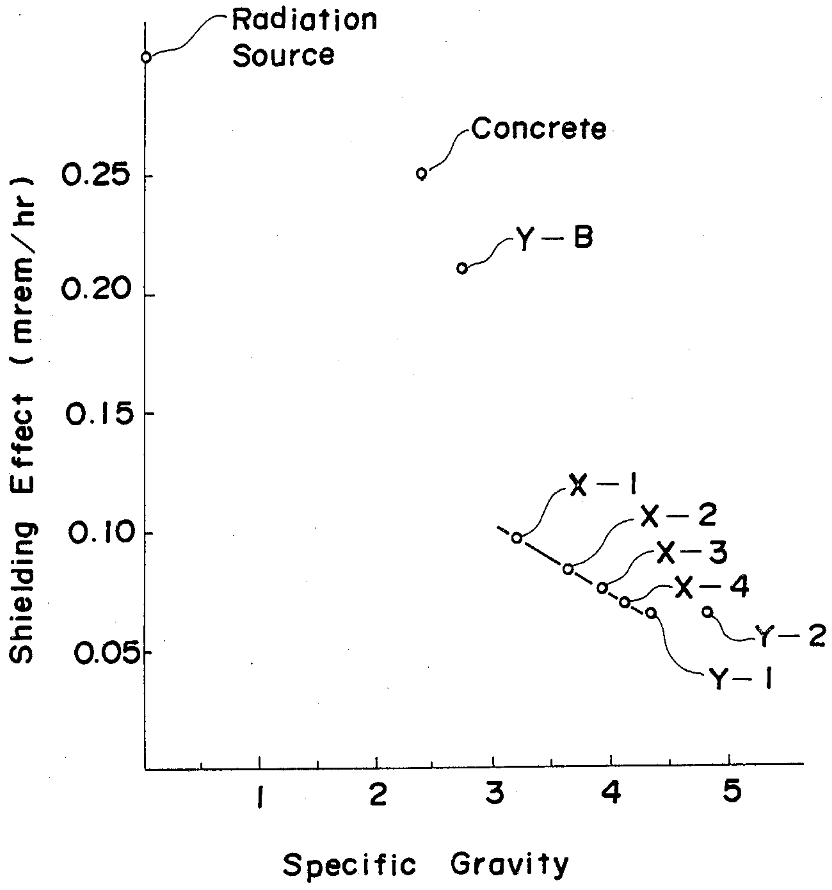
FIG. 1 shows the relationship between the shielding effect and specific gravity of the shielding material of this invention and those of the standard concrete.

The shielding materials of this invention (X-1, X-2, X-3 and X-4) and comparative shielding materials (Y-1, Y-2, Y-3 and Y-4) were made according to the procedure shown in Table 1. Y-B is a melt of sulphur and iron oxide, acts as a surpassing basic inorganic matrix and is listed for reference.

TABLE 1

(weight %)

| | Examples 1-4 | | | | Comparative Examples 1-4 | | | | For Reference |
|---|---|---|---|---|---|---|---|---|---|
| | X-1 | X-2 | X-3 | X-4 | Y-1 | Y-2 | Y-3 | Y-4 | Y-B |
| Sulfur | 32.0 | 26.3 | 22.2 | 19.2 | 17.5 | 10.0 | 0 | 15 | 57 |
| Iron oxide | 22.5 | 18.4 | 15.5 | 13.5 | 12.3 | 7.0 | 15 | 0 | 43 |
| Lead oxide | 45.5 | 55.3 | 62.3 | 67.3 | 70.2 | 83.0 | 85 | 85 | 0 |

The iron oxide used was hematite type $Fe_2O_3$ containing some sodalite, with purity of 92% and grain size of 150-325 mesh; the sulphur used was 98% pure and flaky; and the lead oxide was 99.5% pure with grain size ranging from 300 mesh-5 mm in dia.

The sulphur was heated and melted, incorporated with the iron oxide, maintained at a temperature of 400° C. and then reacted under heat for 30 minutes. In the reaction of the iron oxide and sulphur, the evolution of $SO_2$ gas by the reaction was anticipated but there was hardly any $SO_2$ evolved since it was absorbed in the solid solution system, resulting in no fear of pollution. The lead oxide was then added to the said melt, agitated and mixed together thoroughly, kept at 410° C. for 10 minutes, cast, and then cooled and solidified thereby to obtain panels having a size of 150 mm×150 mm×40 mm (thickness). In Compartive Examples 3 and 4 (Y-3 and Y-4), solidified bodies obtained did not have a viscosity exceeding a given value and they could not be molded into panels.

The panels so obtained were then measured for their apparent specific gravity, compressive strength and radiation shielding effect. The radiation shielding effect was measured using 1.5 Ci, $^{137}Cs$ placed 600 mm away from the panel as the radioactive source. The results are shown in Table 2. The values for a standard concrete shielding material are also listed in the Table for comparison.

TABLE 2

| | Examples 1-4 | | | | Comparative Examples 1-4 | | | | For Reference | |
|---|---|---|---|---|---|---|---|---|---|---|
| | X-1 | X-2 | X-3 | X-4 | Y-1 | Y-2 | Y-3 | Y-4 | Y-B | Concrete |
| Density (g/cm$^3$) | 3.2 | 3.6 | 3.9 | 4.1 | 4.3 | 4.8 | — | — | 2.75 | 2.4 |
| Thickness of specimen (mm) | 40 | 40 | 40 | 40 | 40 | 40 | — | — | 40 | 40 |
| Compressive strength (Kg/cm$^2$) | 370 | 400 | 418 | 440 | 452 | 420 | — | — | — | 185 |
| Shielding effect (m rem/hr) | 0.098 | 0.085 | 0.075 | 0.070 | 0.065 | 0.065 | — | — | 0.22 | 0.2 |

The relationship between the shielding effect and apparent specific gravity of these panel samples are as shown in FIG. 1. As can be seen in the FIG. 1, Y-B has a somewhat greater shielding effect than can be expected from its specific gravity but X-1, X-2, X-3 and X-4 have a remarkably greater shielding effect as compared with Y-B and the concrete. Furthermore, the shielding effect of X-1, X-2, X-3 and X-4 improves linearly in proportion to the specific gravity. In addition Y-1 and Y-2 are unsutable for a shielding material since they are difficult to mold into panels.

As shown in Table 2, the radiation shielding material of this invention is not affected by radical chemical reaction under the irradiation of $\gamma$ or X rays, and has a shielding effect which is 3.3 times as great as that of the standard concrete and also has a compressive strength which is 2.0-2.4 times as high as that of the standard concrete of the same specification.

Subsequently, comparative tests for water and chemical resistance were carried out on concrete widely used as $\gamma$ or X ray shielding materials and the shielding material according to the present invention.

Water resistance test

Three specimens (50×30×20 mm in size) of each of X-2, X-3 and the above concrete were prepared. Then, the specimens were each dipped into 300 cc of natural water (well water: pH 6.8) contained in a 500-cc beaker.

The specimens were taken out 24 months later, weighted after the water adhering to the surfaces thereof was removed with filter paper, dried in a thermostatic chamber at 60° C. for 30 min., allowed to cool and then weighed again. Table 3 shows the difference in weight between the specimens before and after being dried. The values in Table 3 each represent the mean value of those obtained with the three specimens of each kind.

Chemical resistance test

Three specimens (50×30×30 mm in size) of X-2, X-3 and the concrete were prepared and weighed, respectively. Then the specimens were each dipped into 300 cc of a 5% sulfuric acid solution contained in a 500-cc beaker.

The specimens were taken out 12 months later, dipped into pure water for 10 min., dried in a thermostatic chamber at 60° C. for 30 min., naturally cooled and weighed again.

Another chemical resistance test was made following the above procedure except that a 5% hydrochloric acid was used instead of the 5% sulfuric acid solution.

Table 3 shows the difference in weight between the specimens before and after being dipped into the sulfuric or hydrochloric acid solution. The values in Table 3 each represent the mean value of the results obtained with the three specimens of each kind.

TABLE 3

| | Water Resistance Gain in weight (%) in 24 months | Chemical Resistance Loss in weight (%) in 12 months | |
|---|---|---|---|
| Kind of Liquid used | Natural Water (pH 6.8) | 5% $H_2SO_4$ aq. solution | 5% HCl aq. solution |
| X-2 | 0.01 | 1.18 | 2.02 |
| X-3 | 0.01 | 1.10 | 1.82 |
| Concrete | 3.96 | 22.85 | 28.45 |

As is clear from the results shown in Table 3, the radiation shielding materials according to the present invention are proved superior in prevention of water absorption to the conventional concrete without fear of contamination caused by radioactively contaminated water. In cases where the contaminated water sticks to the material, it will be washed away easily with water. Moreover, the shielding materials according to the present invention have excellent chemical resistance compared with the conventional concrete. Therefore, the shielding materials according to the present invention not only have excellent radiation shielding capability but also meet various requirements for the purpose. Since no additional operation including coating of a waterproof paint is required for the shielding materials according to the present invention, they can thus contribute to a reduction in cost of an overall structure in which radioactive rays are handled.

The Effect of the Invention

The radiation shielding material of this invention has an excellent shielding effect as described above. Therefore in building structures with rooms where radiation or X-rays will be used, it is recommended that, for example, a concrete building with standard structural strength is firstly constructed and then lined with the invented shielding material of a thickness enough to shield the amount of radiation used thereby to satisfy the required shielding effect.

Accordingly, a regular building based fundamentally on the structural strength is designed and then only lined with the shielding material of this invention without need of application of expensive lead plates or difficult lead block structure construction, thereby providing a very rational building at a remarkably low cost. Thus, this invention would be one having a high industrial value.

Figure 2:
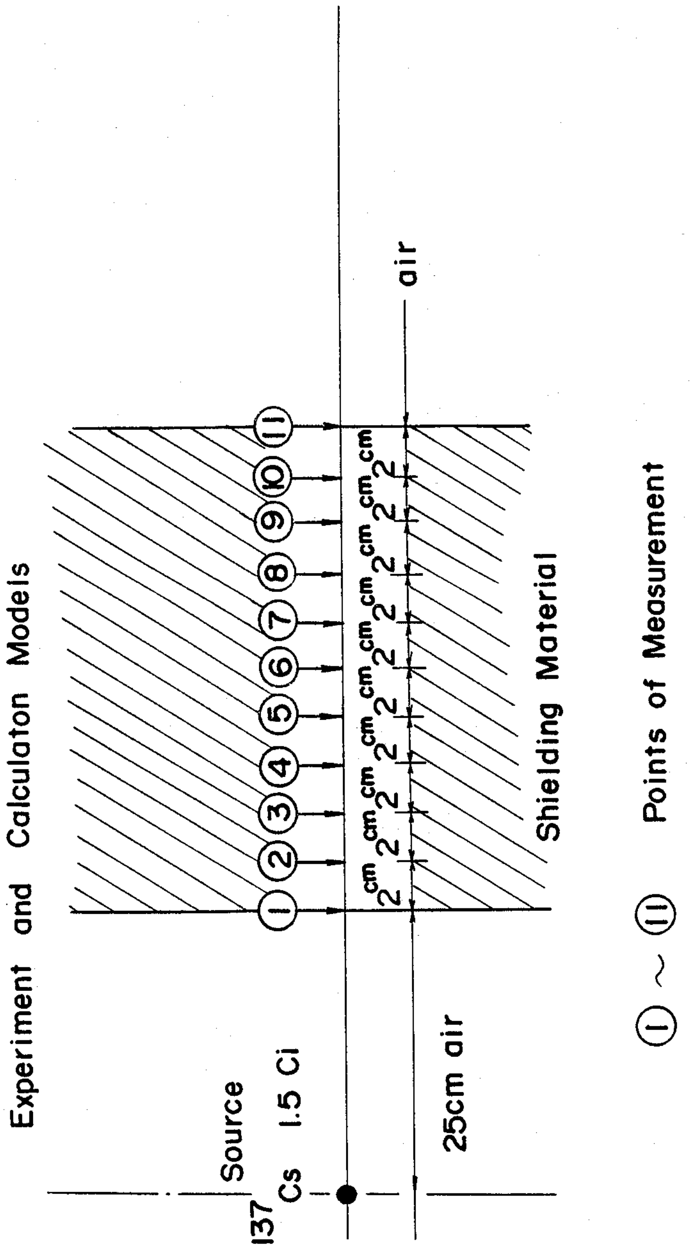
FIG. 2 shows experiment and calculation models.
Figure 3:
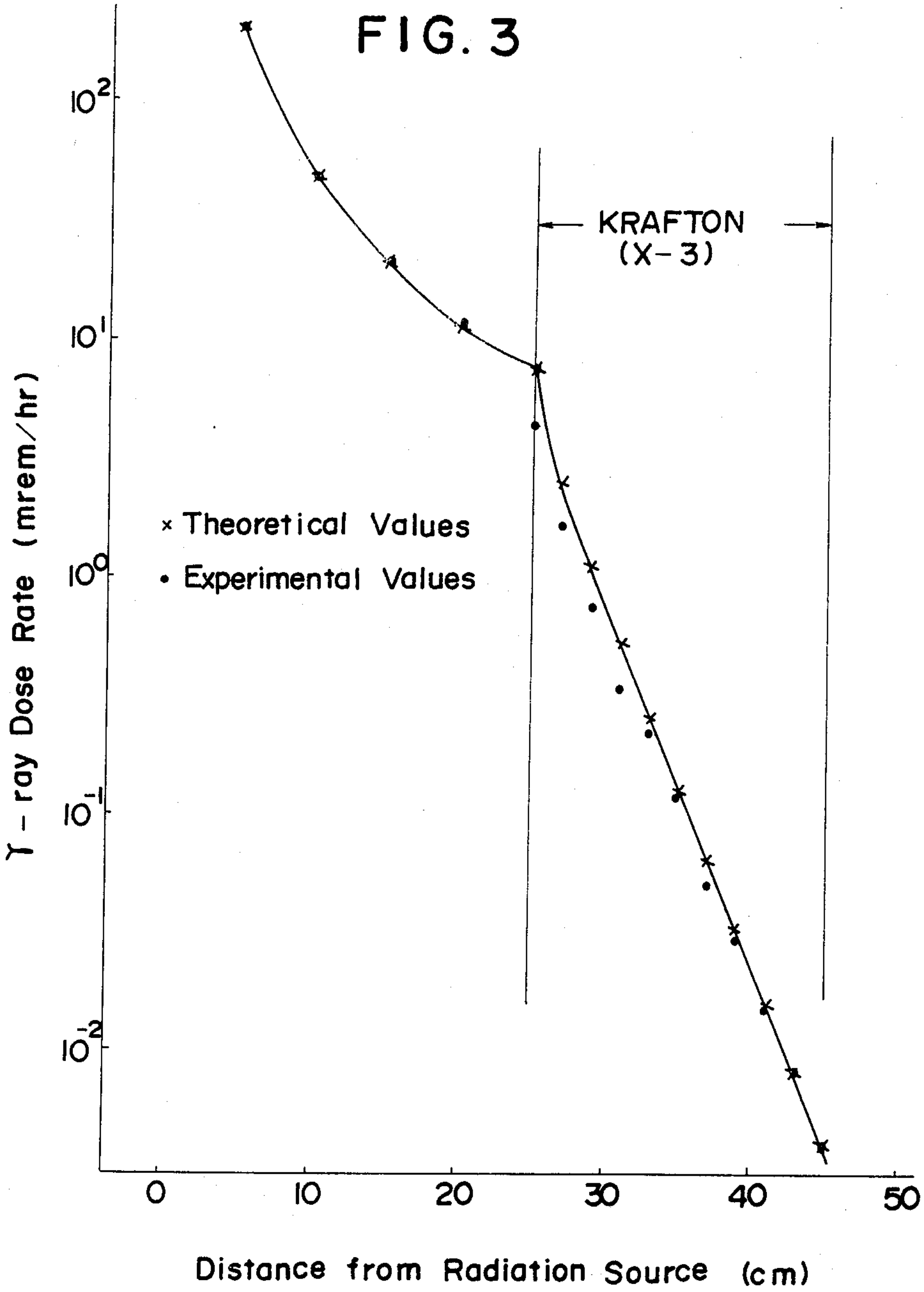
FIG. 3 shows the comparison of theoretical and experimental values for radiation shielding effects obtained from the experiment and calculation shown in FIG. 2.

Comparison of Theoretical and Experimental Values For Radiation Shielding Effects Experimental values for shielding effects were precisely measured (FIG. 2) using the shielding material, X-2, of this invention while theoretical values were obtained by theoretical calculation (calculated by a computer using ANISN CODE) under the same conditions, whereupon it was found that the theoretical values and the experimental ones were approximately in agreement with each other as indicated in FIG. 3 and it was confirmed that the shielding materials of this invention were able to be reasonably designed and constructed as various kinds of shielding structures.

What is claimed is:

1. A radiation shielding material prepared by heating at 115°–440° C. 100 parts by weight of sulphur and 60–100 parts by weight of iron oxide powder to thoroughly react them together whereby a molten matrix is obtained, adding 120–360 parts by weight of granular lead oxide to said molten matrix, heating at 125°–420° C. to disperse said lead oxide in the matrix, molding the resulting dispersion into a predetermined shape to obtain a molding and cooling the molding for solidification thereof.

2. The radiation shielding material according to claim 1, wherein said sulphur is in the lump, powder or flake form.

3. The radiation shielding material according to claim 1, wherein said iron oxide powder has a particle size in the range of 60–325 mesh.

4. The radiation shielding material according to claim 1, wherein said granular lead oxide has a particle size in the range of from 300 mesh to 5 mm.

5. The radiation shielding material according to claim 1, wherein said predetermined shape is a plate, block or cylinder form.

* * * * *